United States Patent Office 3,495,970
Patented Feb. 17, 1970

3,495,970
HERBICIDAL COMPOSITION AND METHOD
Arnold D. Gutman, Pinole, Calif., George E. Lukes, deceased, late of El Cerrito, Calif., by John Hazzard, administrator, Kentfield, and Duane R. Arneklev, Sunnyvale, Calif., assignors to Stauffer Chemical Company, New York, N.Y., a corporation of Delaware
No Drawing. Original application Nov. 29, 1965, Ser. No. 510,408. Divided and this application Jan. 8, 1969, Ser. No. 813,350
Int. Cl. A01n 9/20
U.S. Cl. 71—123    12 Claims

ABSTRACT OF THE DISCLOSURE

The use as herbicides of certain substituted dinitrophenoxyacetophenones.

---

This application is a division of copending application Ser. No. 510,408 filed Nov. 29, 1965.

This invention relates to certain new and novel organic compounds which may be used as effective herbicides. More specifically, this invention relates to certain substituted-dinitrophenoxyacetophenones and to the use of said compounds in herbicidal compositions.

The compounds comprising the instant class correspond to the general formula

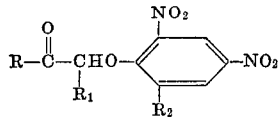

wherein R is a member selected from the group consisting of lower alkyl, phenyl and substituted phenyl wherein said substituents are selected from the group phenyl, nitro, halogen, lower alkyl and lower alkoxy; $R_1$ is a member selected from the group consisting of hydrogen, phenyl and lower alkyl; and $R_2$ is a member selected from the group consisting of hydrogen and lower alkyl. By the term lower alkyl and lower alkoxy herein-above we mean those members of said groups containing from 1 to 6 carbon atoms, inclusive. Also included herein is a method of preparing, using and applying said compositions.

The compounds herein contemplated can be prepared by several methods. One such general method applied in preparing the substituted-dinitrophenoxy acetophenones of the present invention was the condensation of reaction between the appropriate 4,6-dinitrophenol and the requisite α-bromo-ketonyl. The α-bromo-ketonyl may be an acetonyl, phenacyl or substituted-phenacyl, as well as further α-substituted with lower alkyl or phenyl. The reaction proceeds readily in the liquid phase. The employment of an inert organic solvent is also useful, facilitating processing as well as agitation of the reactants. Solvents such as benzene, toluene, dioxane, and the like may be employed satisfactorily. The condensation reaction is preferably carried out in the presence of a hydrogen halide acceptor. Hydrogen halide acceptors such as sodium carbonate, triethylamine, pyridine, picoline and the like may be used. The reaction may be carried out at temperatures that permit operation in the liquid phase and which are between room temperature and reflux temperature of the solvent, if one is employed. Preferably the reaction mixture is refluxed, usually at an elevated temperature.

It has been found that the compounds of the present invention are particularly effective as herbicides. They are effective in the control of the growth of grasses and broadleaf plants with both pre-emergence and post-emergence activity.

The compounds of the present invention may be made in accordance with the following example.

EXAMPLE

Preparation of 2-(2'-sec-butyl-4',6'-dinitrophenoxy)-parachloroacetophenone

In a 500 ml. flask equipped with a stirrer and condenser were combined 11.7 g. (0.05 mole) of -bromo-parachloroacetophenone, 12 g. (0.05 mole) of 2-sec-butyl-4,6-dinitrophenol, 5.05 g. (0.05 mole) of triethylamine and 150 ml. of dioxane as the solvent. The mixture was stirred and heated under reflux for 1½ hours. The mixture was then poured into 300 ml. of ice water and the resulting mixture was extracted with 2–150 ml. portions of chloroform. The chloroform phase was dried over anhydrous magnesium sulfate and the solvent removed by evaporation on a steam bath. The residue was recrystallized from ethanol, yielding 11.3 g. (61.3 percent of theory) of the title compound, M.P. 189–190° C.

The following is a table of the compounds prepared according to the aforedescribed procedures. Compound numbers have been assigned to each compound and are used then for identification throughout the balance of the application.

TABLE I

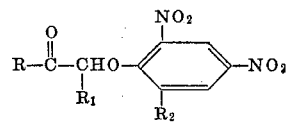

| Compound Number | R | $R_1$ | $R_2$ | $n_D^{30}$ or M.P., ° C. |
|---|---|---|---|---|
| 1 | Phenyl | Hydrogen | sec-Butyl | 1.5850 |
| 2 | do | do | Methyl | 1.6025 |
| 3 | do | do | Hydrogen | 91–95° |
| 4 | do | Phenyl | sec-Butyl | 1.5963 |
| 5 | Biphenyl | Hydrogen | do | 1.5950 |
| 6 | p-Nitrophenyl | do | do | 1.5755 |
| 7 | 2,4-dimethylphenyl | do | do | 1.5902 |
| 8 | Methyl | do | do | 1.5863 |
| 9[1] | p-Chlorophenyl | do | do | 189–190° |
| 10 | 2,4-dimethylphenyl | do | Hydrogen | 147–148° |
| 11 | Methyl | do | do | 89–90° |
| 12 | Biphenyl | do | do | 155–157° |
| 13 | p-Chlorophenyl | do | do | 185–186° |
| 14 | 3,4-dichlorophenyl | do | do | (Semi-solid) |
| 15 | 2,4-dichlorophenyl | do | sec-Butyl | (Semi-solid) |
| 16 | 2,5-dichlorophenyl | do | do | (Semi-solid) |
| 17 | p-Methoxyphenyl | do | do | (Semi-solid) |
| 18 | Methyl | Methyl | do | 1.5328 |
| 19 | Ethyl | Hydrogen | do | 1.5293 |
| 20 | p-Fluorophenyl | do | do | (Semi-solid) |

[1] Prepared in the example.

As previously mentioned, the herein described novel compositions produced in the above described manner are phytotoxic compounds which are useful and valuable in controlling various plant species. The compounds of this invention were tested as herbicides in the following manner.

*Pre-emergence herbicide test.*—The seeds of crab grass, annual bluegrass, watergrass, red oats, pigweed, mustard and curled dock were planted in individual rows one-half inch deep in Santa Cruz sandy loam soil contained in compressed paper flats 8¼" x 6½" which are 2¾" deep. Enough seeds were planted to give about thirty to fifty plants of each of the weed species in each flat. The flats were watered after planting. The following day each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats. The results of this test are reported in Table II.

TABLE II.—PRE-EMERGENCE ACTIVITY RATE 20 LBS./ACRE

| Compound Number: | Crab grass | Annual blue grass | Water grass | Red oats | Pig weed | Mustard | Curled dock |
|---|---|---|---|---|---|---|---|
| 1 | ++ | +++ | ++ | + | +++ | +++ | +++ |
| 2 |  | +++ |  |  | +++ | +++ |  |
| 3 |  |  | + |  | +++ |  |  |
| 4 | ++ | +++ |  | + | +++ |  | +++ |
| 5 |  | +++ | +++ | +++ | +++ | +++ | +++ |
| 6 | ++ | +++ | +++ | ++ | +++ | +++ | +++ |
| 7 | +++ | +++ | +++ | +++ | +++ | +++ | +++ |
| 8 | +++ | +++ | +++ | ++ | +++ | +++ | +++ |
| 10 |  | + |  |  |  |  |  |
| 11 | +++ | ++ |  | ++ |  | + | + |
| 14 | + |  |  |  |  |  |  |
| 15 | ++ | ++ | ++ |  | +++ | +++ | + |
| 16 |  |  |  |  | ++ | ++ |  |
| 17 | +++ | +++ | ++ | + | +++ | +++ | +++ |
| 19 | + | + | + |  | ++ | ++ | + |

+=slight injury.
++=moderate injury.
+++=severe injury or death.

*Post-emergence herbicide test.*—The seeds of five weed species, crab grass, watergrass, red oats, mustard, curled dock and one crop, pinto beans (*Phaseolus vulgaris*) were were planted in individual rows as described in the pre-emergence test, supra. Two weeks after planting the plant foliage was sprayed with a solution of the test compounds at a rate equivalent to 20.0 pounds/acre. The treated plants were placed back in the greenhouse. Injury ratings were recorded 14 days after treatment. The rating system is the same as that used in the pre-emergence test. Table III lists the results obtained therefrom.

TABLE III.—POST-EMERGENCE ACTIVITY RATE 20.0 LBS./ACRE

| Compound Number | Crab grass | Water grass | Red oats | Mustard | Curled dock | Pin bean |
|---|---|---|---|---|---|---|
| 1 | +++ | +++ | +++ | +++ | +++ | +++ |
| 2 | +++ | +++ | +++ | +++ | +++ | +++ |
| 3 | ++ |  |  | +++ | + |  |
| 4 | +++ | +++ | +++ | +++ | +++ | + |
| 5 | +++ | ++ | +++ | +++ | +++ | +++ |
| 6 | +++ | +++ | +++ | +++ | +++ | +++ |
| 7 | +++ | +++ | +++ | +++ | +++ | +++ |
| 8 | +++ | +++ | +++ | +++ | +++ | +++ |
| 9 |  |  |  |  |  | + |
| 10 |  |  |  | + | +++ | + |
| 11 | +++ |  | + | +++ | +++ | +++ |
| 12 |  |  |  | ++ |  |  |
| 13 |  |  |  | ++ |  |  |
| 14 |  |  |  | + |  |  |
| 15 | +++ | ++ | ++ | +++ | ++ | +++ |
| 16 |  |  |  | +++ | ++ | +++ |
| 17 | +++ | ++ | ++ | +++ | +++ | +++ |
| 18 |  |  |  | +++ | ++ | ++ |
| 19 | ++ | ++ | + | +++ | ++ | ++ |
| 20 |  |  |  |  |  | + |

On further evaluation of post-emergence activity compound number 1 produced 75 percent or better control of crab grass, foxtail, mustard and curled dock at 2 lbs. per acre. Compounds 2, 4 and 5 exhibited 95 percent or better control of pigweed, mustard and curled dock. Compound number 6 gave 80 percent or better control of wild oats, pigweed, mustard and curled dock. Compound number 7 exhibited 85 percent or better control of crab grass, foxtail, watergrass, pigweed, mustard and curled dock. Compound number 8 gave 80 percent or better control of all the grass and broadleaf test species.

The compounds of the instant invention also are active as insecticides and microbiocides. It was found that compound number 8 had an LD–50 of 0.01% on the nymphal form of two-spotted mite, *Tetranychus telarius* (Linn.). Similarly compounds number 4, 5 and 7 had an LD–50 of 0.02% on the nymphal form of two-spotted mite. Compounds 5, 7 and 8 had an LD–50 of 0.02% and compound 4 an LD–50 of 0.05% on two-spotted mite eggs. Compounds number 1 and 7 controlled the growth of *Aspergillus niger* at 10 parts per million (p.p.m.). Compound number 15 controled *A. niger* at 25 p.p.m. Compound number 1 also controlled Pencillium sp. at 10 p.p.m.

The compounds of the present invention may be used as pre-emergence or post-emergence herbicides, insecticides and microbiocides and may be applied in a variety of ways at various concentrations. In practice the compounds are usually formulated with an inert adjuvant, utilizing methods well-known to those skilled in the art, thereby making them suitable for application as dusts, sprays, drenches, and the like. The amount applied, when used as herbicides, will depend upon the nature of the seeds or plants to be controlled and the rate of application may vary from 1 to 50 pounds per acre. One particularly advantageous way of applying the herbicidal composition comprising the adjuvant and an effective amount of a compound of the present invention is as a narrow band along a row crop, straddling the row.

Various changes and modifications may be made without departing from the spirit and scope of the invention described herein as will be apparent to those skilled in the art to which is pertains. It is accordingly intended that the present invention shall only be limited by the scope of the appended claims.

We claim:

1. The method of combatting weeds comprising applying thereto a phytotoxic amount of a compound of the formula

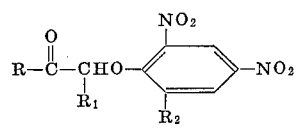

wherein R is a member selected from the group consisting of lower alkyl, phenyl and substituted phenyl, wherein said substituents are selected from the group phenyl, nitro, halogen, lower alkyl and lower alkoxy; $R_1$ is a member selected from the group consisting of hydrogen, phenyl and lower alkyl; and $R_2$ is a member selected from the group consisting of hydrogen and lower alkyl.

2. An herbicidal composition comprising an inert herbicidal adjuvant and a phytotoxic amount of a compound of the formula

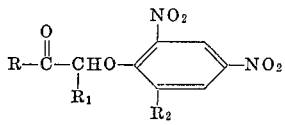

wherein R is a member selected from the group consisting of lower alkyl, phenyl and substituted phenyl, wherein said substituents are selected from the group phenyl, nitro, halogen, lower alkyl and lower alkoxy; $R_1$ is a member selected from the group consisting of hydrogen, phenyl; and $R_2$ is 2-sec.-butyl.

3. A method of combatting weeds according to claim 2 wherein R is phenyl, $R_1$ is phenyl and $R_2$ is 2-sec-butyl.

4. An herbicidal composition according to claim 3 wherein R is phenyl, $R_1$ is phenyl and $R_2$ is 2-sec-butyl.

5. A method of combatting weeds according to claim 2 wherein R is p-biphenylyl, $R_1$ is hydrogen and $R_2$ is 2-sec-butyl.

6. An herbicidal composition according to claim 3 wherein R is p-biphenylyl, $R_1$ is hydrogen and $R_2$ is 2-sec-butyl.

7. A method of combatting weeds according to claim 2 wherein R is p-nitrophenyl, $R_1$ is hydrogen and $R_2$ is 2-sec-butyl.

8. An herbicidal composition according to claim 3 wherein R is p-nitrophenyl, $R_1$ is hydrogen and $R_2$ is 2-sec-butyl.

9. A method of combatting weeds according to claim 2 wherein R is 2,4-dimethylphenyl, $R_1$ is hydrogen and $R_2$ is 2-sec-butyl.

10. An herbicidal composition according to claim 3 wherein R is 2,4-dimethylphenyl, $R_1$ is hydrogen and $R_2$ is 2-sec-butyl.

11. A method of combatting weeds according to claim 2 wherein R is methyl, $R_1$ is hydrogen and $R_2$ is 2-sec-butyl.

12. An herbicidal composition according to claim 3 wherein R is methyl, $R_1$ is hydrogen and $R_2$ is 2-sec-butyl.

References Cited

UNITED STATES PATENTS 2,629,741  2/1953  Drake _____ 71—123 X

OTHER REFERENCES

Whalley: J. Chem. Soc., 1950, 2241–2243.

Neber et al.: Liebig's Annalen, 515, 283 and 296 (1935).

JAMES O. THOMAS, JR., Primary Examiner